United States Patent
Maessen

(10) Patent No.: US 6,754,743 B2
(45) Date of Patent: Jun. 22, 2004

(54) VIRTUAL INSERTION OF CELLS FROM A SECONDARY SOURCE INTO A FIFO

(75) Inventor: Jan Maessen, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 226 days.

(21) Appl. No.: 10/025,309

(22) Filed: Dec. 19, 2001

(65) Prior Publication Data

US 2002/0087756 A1 Jul. 4, 2002

(30) Foreign Application Priority Data

Jan. 4, 2001 (EP) .......................................... 01300045

(51) Int. Cl.[7] .............................................. G06F 13/00
(52) U.S. Cl. .............................. 710/56; 710/18; 710/37
(58) Field of Search ................................. 710/7, 15–19, 710/20, 29–35, 51–56; 709/234–236; 370/324, 474

(56) References Cited

U.S. PATENT DOCUMENTS

| | | | |
|---|---|---|---|
| 4,419,728 A | * 12/1983 | Larson | 710/305 |
| 5,151,999 A |   9/1992 | Marzucco et al. | 395/800 |
| 5,490,007 A |   2/1996 | Bennett et al. | 359/139 |
| 5,664,116 A | *  9/1997 | Gaytan et al. | 709/234 |
| 5,961,640 A | * 10/1999 | Chambers et al. | 712/300 |
| 5,978,868 A | * 11/1999 | Maas | 710/52 |
| 6,385,672 B1 | *  5/2002 | Wang et al. | 710/56 |
| 6,389,489 B1 | *  5/2002 | Stone et al. | 710/57 |
| 6,611,884 B2 | *  8/2003 | Castellano | 710/29 |

FOREIGN PATENT DOCUMENTS

| | | | |
|---|---|---|---|
| EP | 58168144 | 4/1983 | G06F/7/32 |
| EP | 61095643 | 5/1986 | H04L/13/08 |
| EP | 1221647 A1 | *  7/2002 | G06F/5/06 |
| JP | 58168144 | 10/1983 | G06F/7/32 |
| JP | 61095643 | 5/1986 | H04L/13/08 |

OTHER PUBLICATIONS

European Search Report.

* cited by examiner

Primary Examiner—Christopher B. Shin

(57) ABSTRACT

A FIFO for buffering a cell between an incoming stream ($D_{in}$) and an outgoing stream ($D_{out}$), comprising a memory, a write pointer indicating a first memory location for storing the cell, and a read pointer indicating a second memory location for releasing a stored cell, a controller, and additional memory for storing an additional cell;
the controller arranged for:
monitoring the additional cell's arrival in the additional memory;
storing a pointer value (LOG_PTR) upon the additional cell's arrival, using a momentary write pointer value;
monitoring a momentary read pointer value;
upon equivalence of the read pointer and LOC_PTR;
inserting the stored additional cell into the outgoing stream ($D_{out}$);
inserting content from the second memory location into the outgoing stream ($D_{out}$).

11 Claims, 3 Drawing Sheets

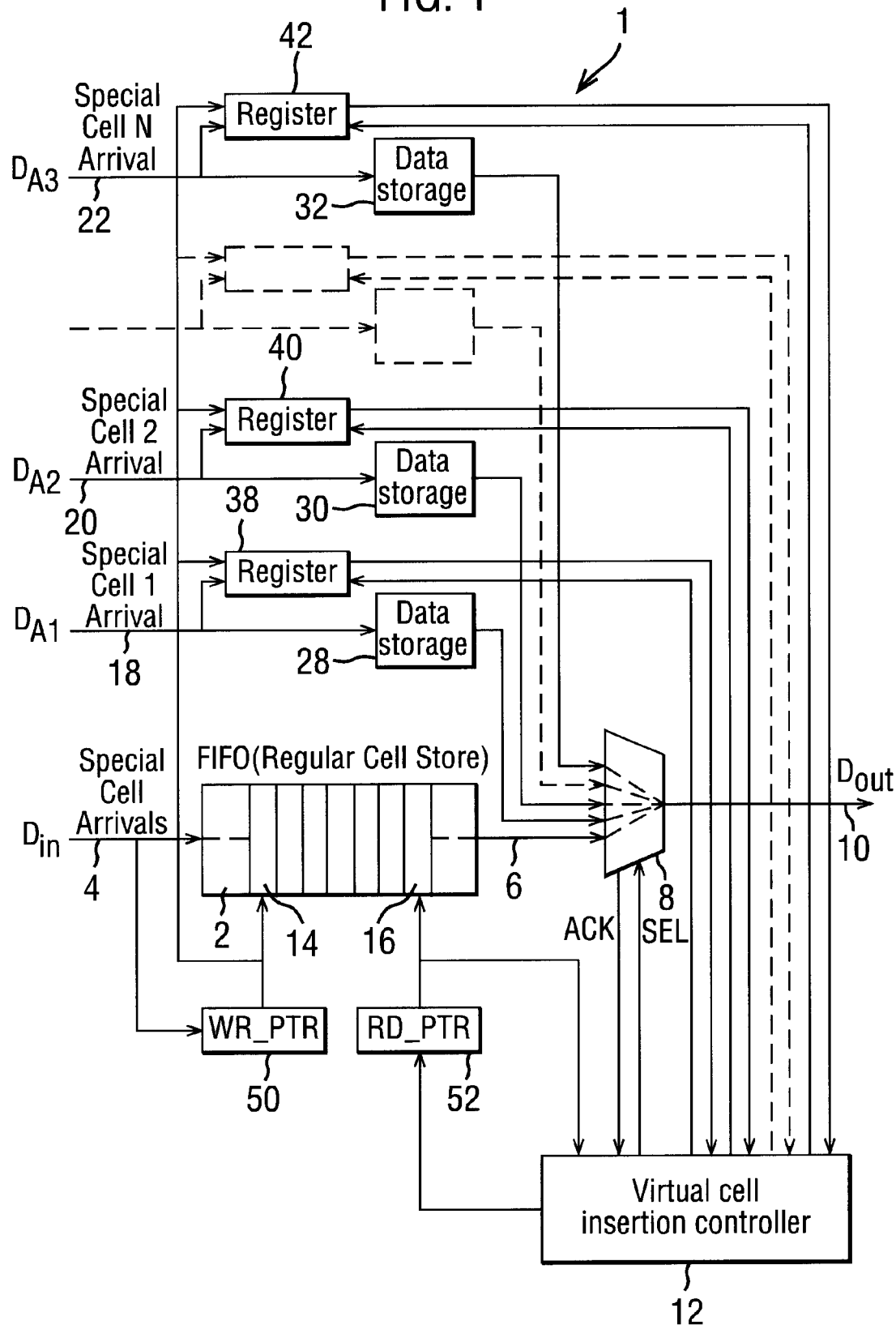

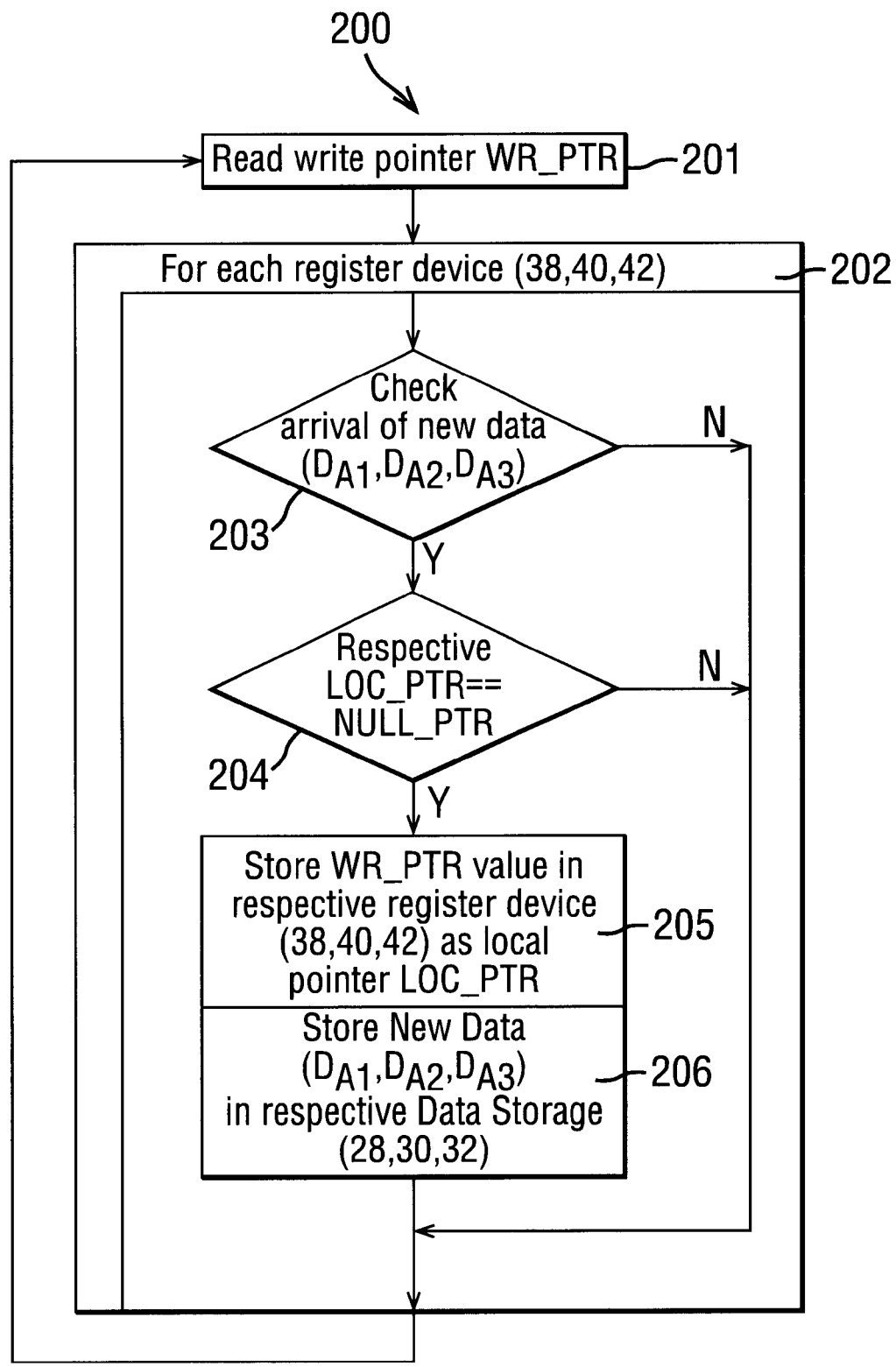

VIRTUAL INSERTION OF CELLS FROM A SECONDARY SOURCE INTO A FIFO

CROSS REFERENCE TO RELATED APPLICATION

This application claims priority of European Application No. 01300045.0 filed on Jan. 4, 2001.

BACKGROUND OF THE INVENTION

1. Field of the Invention

The present invention relates to temporary data buffers, such as FIFO (first in, first out) buffers and stack buffers. Such buffers find application in many electronic devices, such as data-communication devices and computers.

2. Description of the Related Art

FIFOs are typically used for data rate adaptation i.e. data that is entering a system at a certain speed (bit rate) is adapted to the (different) speed of the systems clock rate by means of a FIFO. The rate adaptation to this fixed clock is realised by adding (or removing) justification data to (or from) the stream coming out of the system. This data is then transmitted e.g. over a glass fibre. At the receive side the justification data is added/removed again to reconstruct the original data stream.

In ATM (asynchronous transmission mode) systems, a cell stream may typically have a "bursty" nature i.e. ATM cells may randomly arrive in smaller or larger quantities per time unit. However to transport this traffic over larger distances (via fiber on e.g. a wide area network) the data needs to be adapted into a continuous data stream with a fixed bit rate. A FIFO can be used to handle this rate adaptation.

The FIFO is used as a temporary storage buffer (elastic store) to even out bursts. The size of a FIFO determines how much "burstiness" the FIFO can even out: usually the larger the better. However a large buffer size also often means a large latency (throughput delay) of the cells, which is undesirable in case of real-time traffic (CBR, rt-VBR). So an optimum in the size of a FIFO must be found between rate adaptation capacity and maximum throughput delay.

In ATM systems the data rate adaptation is also called cell rate decoupling. Justification is performed by adding so called "Idle" cells to a data stream. This is done in case there are no payload cells available i.e. when the FIFO is empty. In case the FIFO is full, no more cells are written in the FIFO, so just thrown away.

In PDH (Plesiochronous Digital Hierarchy) systems FIFOs are used to merge multiple bitstreams which are plesiochronous to one another into one single higher order bitstream. In this way:

four 2 Mb/s plesiochronous streams are merged into one 8 Mb/s stream four 8 Mb/s plesiochronous streams are merged into one 34 Mb/s stream four 34 Mb/s plesiochronous streams are merged into one 140 Mb/s stream four 140 Mb/s plesiochronous streams are merged into one 565 Mb/s stream The data rate adaptation is achieved by positive justification i.e., if required a data bit in the higher order bit stream can be replaced by a justification bit. So called "Justification Control" bits are sent along with the data to indicate when a justification action needs to takes place. In this way the receiver is able to reconstruct the original tributary signal by removing the justification bit from the data stream. A justification action is required when the FIFO of a tributary stream is about to be depleted (underflow).

Although SONET (Synchronous Optical Network) and SDH (Synchronous Digital Hierarchy) systems deal with "synchronous" data, due to jitter and wander it is still required to align the data that are entering such a system and adapt the data-rate to an almost equal (but not quite) system clock. This is done by means of FIFOs. Also, here the adaptation is achieved by justification. Both positive justification (by removing stuff data) and negative justification (by adding stuff data) is possible.

Schematically, in a FIFO buffer data is entered at an entrance and is sent out at an exit in a sequence of "first in, first out". During the time between the entrance and the exit the data is stored (buffered) in the FIFO. To that end, the FIFO consists of a memory device, which is capable of containing data. For the operation of the buffer, two counters are maintained. A first counter indicates the location of the memory cell, in which at a given instant data is to be entered or written. This first counter is referred to as the write-pointer. A second counter indicates the location of the memory cell, from which at a given instant data is to be sent out or read. This second counter is referred to as the read-pointer. By incrementing both pointers with a wrap-around from the highest memory location to the lowest, the entry- and exit-point "move" through all memory locations in a continuous loop: the FIFO buffer can thus be used as a so-called circular buffer.

Typically, the memory device of a FIFO consists of an SRAM (static random access memory) device, in an arrangement with a single- or dual-port for accessing memory locations. In case of a dual-port SRAM, one port is used for entering data (write access port) and the other is used for exporting data (read access port). In a single-port SRAM one port has both functions, which are performed in an interleaved manner by a Time Division Multiple Access (TDMA) scheme.

Due to the relatively lower costs for single-port SRAMs, many FIFOs comprise single-port SRAM devices in stead of the more expensive dual-port SRAMs.

To obtain a throughput for a FIFO comprising a single-port SRAM in interleaved mode, comparable to that for a dual-port SRAM FIFO, the read and write access speed and the data bus width for such a single-port SRAM must be doubled in comparison to the specifications for the dual-port SRAM.

Characteristically for a FIFO, all data that need to pass the FIFO, must first enter the buffer through a write access port. In some cases, the insertion of additional data from a secondary source into the outgoing data stream is desired. For example, in ATM-PON (Asynchronous Transfer Mode—Passive Optical Network) systems it is required to enter additional network operation and management data, i.e., PLOAM (Physical Layer Operations Administration and Maintenance) cells, into a data stream between the user ONT (Optical Network Termination) devices and a PON host system. Therefore, an additional write access port is needed on the FIFO. Adding this secondary write access to the FIFO is often very hard to implement, or even impossible. Especially, this problem occurs in dedicated circuitry, with hard-wired write and read pointers. No satisfying solution exists so far.

In case of a single-port SRAM device, when already a TDMA scheme is used for read and write access, the TDMA scheme must be extended for additional write slots on the single memory interface. This requires a higher access speed and a further widening of the data bus, in order to maintain the same throughput as without the additional access. Similarly, in a dual-port SRAM-based FIFO, a TDMA scheme may be used for additional write access cycles. Again, this requires higher access speed and widening of the data bus, to maintain the same throughput as without the additional access cycles. In both cases, this extension of the functionality of the device is often not feasible.

Also, replacement of a single-port SRAM by a dual-port SRAM is often not cost-effective, as mentioned above. Application of triple-port SRAM is, in most cases, even prohibitively expensive compared to single- or dual-port devices.

BRIEF SUMMARY OF THE INVENTION

It is an object to provide an arrangement and method for a FIFO buffer device, which allows additional data from at least one additional data stream to be inserted into the outgoing data stream of the FIFO device without a requirement for additional ports on the FIFO device.

The present invention relates to a FIFO buffer arrangement for temporarily buffering a data packet from an incoming data stream before releasing the data packet into an outgoing data stream, comprising a memory device, a write pointer register, a read pointer register, the data packet containing a plurality of bytes; the memory device comprising a write access port and a read access port, the write pointer register containing a write pointer; the read pointer register containing a read pointer; the write pointer being arranged to indicate a first location in the memory device, momentary available for storing the data packet; the read pointer being arranged to indicate a second location in the memory device, momentary available for releasing a stored data packet to the out-going data stream; characterised in that the FIFO buffer arrangement further comprises a controller complex and additional memory, the controller complex being connected to the additional memory, to the memory device, and to the read pointer register, the additional memory being arranged to store at least one additional data packet, the controller complex being arranged to carry out the following functions:

continuously monitoring arrival of the at least one additional data packet in the additional memory;

storing a registered write pointer value each time at least one additional data packet arrives in the additional memory, the registered write pointer value having a predetermined relation with a momentary value of the write pointer at that time;

continuously monitoring a momentary value of the read pointer;

checking whether the read pointer has the predetermined relation with the registered write pointer value; if so, as an additional step:

reading the at least one additional data packet from the additional memory and inserting the at least one additional data packet in the outgoing data stream;

reading content from the second location in the memory device and inserting the content into the outgoing data stream.

Moreover, the present invention relates to a FIFO buffer arrangement as described above, characterised in that the FIFO buffer arrangement further comprises a selection device, a virtual cell insertion controller, data storage means, register memory means, an exit port, input means; the selection device being connected to the read access port and the exit port; the virtual cell insertion controller being connected to the write pointer register, the read pointer register, to the selection device, the data storage means, and the register memory means; the input means being connected to the data storage means and being arranged to insert an additional data packet into the data storage means; the register memory means is arranged to carry out the following steps:

to monitor continuously the arrival of the additional data packet in the data storage means;

to register the instant of arrival of the additional data packet by storing a momentary value, related to the instant of arrival, in the register memory device related to the data storage means as a registered write pointer value;

and the virtual cell insertion controller is also arranged to carry out the following steps:

to monitor continuously the momentary value of the read pointer;

to compare the value of the read pointer with the registered write pointer value stored in the register memory means;

on equality of the value of the read pointer and the registered write pointer value, to instruct the selection device to fetch the additional data packet from the data storage means related to the register memory means containing the registered write pointer value and, further, to transmit the additional data packet into the out-going data stream;

to instruct the selection device to fetch a byte from the second location in the memory device, the second location being indicated by the momentary value of the read pointer.

Furthermore, the present invention relates to a FIFO buffer arrangement as described above, characterised in that the memory device is a dual-port SRAM device.

Also, the present invention relates to a FIFO buffer arrangement as described above, characterised in that the memory device is a single-port SRAM device using a Time Division Multiple Access scheme.

Further, the present invention relates to a FIFO buffer arrangement as described above, characterised in that the data storage device and the register memory device are arranged as a combined register memory and data storage device.

Also, the present invention relates to a FIFO buffer arrangement as described above, characterised in that the virtual cell insertion controller and the selection device are arranged as a combined virtual cell insertion control and selection device.

The present invention further relates to a FIFO buffer arrangement as described above, characterised in that the virtual cell insertion controller, the selection device, the data storage device and the register memory device are arranged as a single combined controller device.

Moreover, the present invention relates to a FIFO buffer arrangement as described above, characterised in that the single combined controller device is an ASIC or FPGA.

The present invention also relates to a method to be carried out by a FIFO buffer arrangement, as described above, characterised in that the FIFO buffer arrangement further comprises a controller complex and additional memory, the controller complex being connected to the additional memory, to the memory device, to the write pointer register and to the read pointer register, the additional memory being arranged to store at least one additional data packet, and the method comprises the following steps:

to continuously monitor the arrival of the at least one additional data packet in the additional memory;

to store a registered write pointer value each time at least one additional data packet arrives in the additional memory, the registered write pointer value having a predetermined relation with a momentary value of the write pointer at that time;

to continuously monitor a momentary value of the read pointer;

to check whether the read pointer has the predetermined relation with the registered write pointer value; if so, as an additional step:

to read the at least one additional data packet from the additional memory and inserting the at least one additional data packet in the outgoing data stream;

to read content from the second location in the memory device and to insert the content into the outgoing data stream.

Moreover, the present invention relates to a computer program product to be loaded by a FIFO buffer arrangement, as described above, characterised in that the FIFO buffer arrangement further comprises a controller complex and additional memory, the controller complex being connected to the additional memory, to the memory device, to the write pointer register and to the read pointer register, the additional memory being arranged to store at least one additional data packet, and the computer program product, after being loaded, provides the FIFO buffer arrangement with the capacity to carry out the following steps:

to continuously monitor the arrival of the at least one additional data packet in the additional memory;

to store a registered write pointer value each time at least one additional data packet arrives in the additional memory, the registered write pointer value having a predetermined relation with a momentary value of the write pointer at that time;

to continuously monitor a momentary value of the read pointer;

to check whether the read pointer has the predetermined relation with the registered write pointer value; if so, as an additional step:

to read the at least one additional data packet from the additional memory and inserting the at least one additional data packet in the outgoing data stream;

to read content from the second location in the memory device and to insert the content into the outgoing data stream.

Also, the present invention relates to a data carrier provided with a computer program product as described above.

BRIEF DESCRIPTION OF THE DRAWINGS.

In the following the present invention will be explained with reference to some drawings. These drawings are intended for illustration purposes only, and not to limit the scope of protection as defined in the accompanying claims.

FIG. 1 shows schematically an arrangement of a FIFO according to the present invention;

FIG. 2a shows schematically a block diagram of a procedure performed by a FIFO of the present invention for virtual storage of additional data in the FIFO;

Figure 2B:
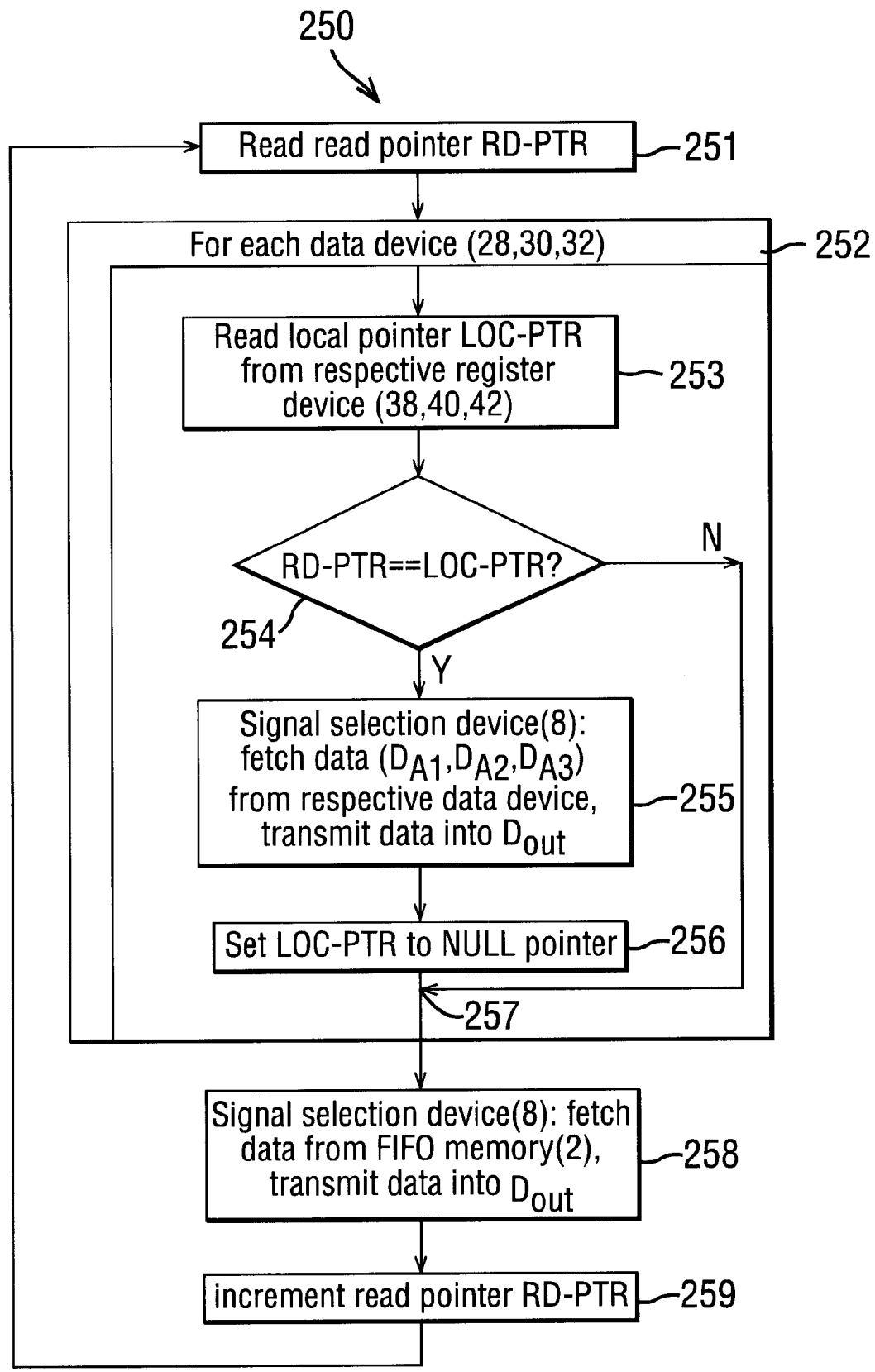
FIG. 2b shows schematically a block diagram of a procedure performed by a FIFO of the present invention for inserting virtually stored additional data from the FIFO into an out-going data stream.

DETAILED DESCRIPTION OF THE INVENTION.

FIG. 1 shows schematically an arrangement of a FIFO according to the present invention. In the arrangement 1, a memory device 2 is connected to an entrance port 4 for entering digital data from a main data stream $D_{in}$, into the memory device 2 and to a first exit port 6, at which point the data leave the memory device 2. The first exit port 6 is connected to a selection device 8, which is also connected to a plurality of data storage devices 28, 30, 32. FIG. 1 shows three such data storage devices 28, 30, 32. However, as indicated by a dotted line more of them may be applied. In accordance with the invention there is at least one such data storage device.

Further, the selection device 8 is connected to a second exit port 10, from which point a data stream $D_{out}$ is forwarded. The selection device 8 also connects to a virtual cell insertion controller 12 for controlling the insertion of additional data into the data stream forwarded.

A plurality of insertion devices (not shown) that generate additional digital data $D_{A1}$, $D_{A2}$, $D_{A3}$ to be merged with the digital data stream $D_{in}$ into the out-going data stream $D_{out}$, is connected to the data storage devices 28, 30, and 32, respectively, via respective input lines 18, 20 and 22.

The virtual cell insertion controller 12 is connected to a read pointer register 52 that stores the value of the read pointer RD_PTR.

Also, virtual cell insertion controller 12 is connected to a plurality of register memory cells 38, 40, and 42 for registering the arrival of the respective additional digital data $D_{A1}$, $D_{A2}$, $D_{A3}$ in their respective data storage devices 28, 30, and 32. The register memory devices 38, 40, 42 are also connected to the respective signal outputs 18, 20, 22 of the insertion devices.

The arrangement 1 of the FIFO according to the present invention may be encompassed in an ATM-PON system, which provides communication services over high speed, high capacity networks. The communication services may comprise various protocols for data-communication, e.g. telephone services as PSTN and ISDN, digital video/audio broadcasting, Internet services (TCP/IP), etc.

In the main data stream, data $D_{in}$ for data-communication, is entered at the entrance port 4. The data $D_{in}$ comprise data packets of bytes (cells) which are to be stored temporarily in the FIFO. At arrival of a data packet at the entrance port 4, each byte in the packet is stored in a memory location of the memory device 2 in the consecutive order of arrival of the bytes in the data packet. The storage location of a byte from the data packet $D_{in}$ in the memory device 2 is determined by the value of the write pointer WR_PTR, as known from the prior art. When a data packet in data stream $D_{in}$ arrives at the memory device 2, this is signalled and after arrival, the value of WR_PTR is incremented. A particular data packet, such as an ATM cell containing 53 bytes, is stored, for example, at location 14 of the memory device 2.

In the main data stream, additional data may need to be inserted in out-going data stream $D_{out}$, for example, for network operation and management functions, such as PLOAM cells in ATM-PON systems. As known to persons versed in the art, the size of such additional digital data packets is equal to the size of the payload data packets of the main data stream.

In FIG. 1 a plurality of additional digital data $D_{A1}$, $D_{A2}$, $D_{A3}$ may be merged with the digital data stream $D_{in}$. A data packet comprising additional data $D_{A1}$, $D_{A2}$, or $D_{A3}$ is entered via it's respective input line 18, 20, or 22 at the respective data storage device 28, 30, or 32, and stored in the respective location. The memory capacity of the storage device 28, 30, 32 is sufficiently large to store the additional digital data packet $D_{A1}$, $D_{A2}$, $D_{A3}$ comprising one ATM cell (PLOAM). A new PLOAM cell can only be entered if the LOC_PTR is set to NULL_PTR.

In the present invention, at the instant that an additional digital data packet $D_{A1}$, $D_{A2}$, $D_{A3}$ is stored in it's respective data storage device 28, 30, 32, this event is signalled and the momentary value of WR_PTR is stored in the register memory device 38, 40, 42, related to the respective data storage device, to mark the time of arrival of $D_{A1}$, $D_{A2}$, $D_{A3}$. Otherwise, the register memory device 38, 40, 42, related to the respective data storage device, contains the NULL pointer, which indicates that no additional data $D_{A1}$, $D_{A2}$, $D_{A3}$ is stored in the respective data storage device 28, 30, 32.

The insertion into the outgoing data stream $D_{out}$ of an additional digital data packet $D_{A1}$, $D_{A2}$, $D_{A3}$ which is stored at it's respective data storage device 28, 30, 32 is described in the following.

The read pointer RD_PTR points to a location in the memory device 2 to be read-out. In a FIFO from the prior art, a cell in a data packet $D_{in}$ is transmitted from the memory device 2 at the first exit port 6 as soon as the read pointer RD_PTR points to that particular cell's location in the memory device 2. For example, at a given value of RD_PTR as shown in FIG. 1, a cell stored at location 16 is fetched and forwarded to the first exit port 6.

In the present invention, before the action described above occurs, the value of the read pointer RD_PTR, as stored in the read pointer register 52, is read by the virtual cell insertion controller 12. The virtual cell insertion controller 12 checks if the value stored at each of the register memory device 38, 40, 42, is equal to the momentary value of RD_PTR. If so, an additional digital data packet $D_{A1}$, $D_{A2}$, $D_{A3}$ must have been stored at the earlier instant the write pointer WR_PTR had the corresponding value. Now, the virtual cell insertion controller 12 signals the selection device 8 to fetch the data from the data storage device 28, 30, 32 related to the register memory device 38, 40, 42 which holds the momentary value of RD_PTR.

Then, in a single coupled action, the selection device 8 fetches and forwards the data packet to the second exit port 10 for further transmission in the out-going data stream $D_{out}$. The read out of the FIFO 2 and the data storage device 28, 30, 32 is done on a byte-by-byte basis. Upon reception of an acknowledgement signal from the selection device 8 that a read out of a cell from the data storage device 28, 30, 32 is completed, the virtual cell insertion controller 12 changes the value in the register memory device 38, 40, 42 to the NULL pointer.

Subsequently, after the virtual cell insertion controller has checked all the register memory devices 38, 40, 42 (by comparing RD_PTR with the respective LOC_PTR stored in the register memory device 38, 40, 42), the selection device 8 fetches the data stored in the memory device 2 at the location of the momentary value of RD_PTR, and forwards these data into the out-going data stream $D_{out}$.

Then, after receiving an acknowledge signal of the selection device 8 that the read out of the FIFO 2 is completed, the virtual cell insertion controller 12 increments the value of RD_PTR. The read-out procedure is now repeated for the new value of RD_PTR.

It is noted that at a given instant more than one additional digital data packet $D_{A1}$, $D_{A2}$, $D_{A3}$ may have been stored. Thus, the virtual cell insertion controller 12 may signal the selection device 8 to fetch the data from all the corresponding data storage devices successively, before fetching data from the memory device 2.

Preferably, the virtual cell insertion controller 12 is arranged as a state machine. The main functions performed by the FIFO arrangement 1 of the present invention are shown in FIGS. 2a and 2b.

FIG. 2a shows schematically a block diagram of a procedure performed in a FIFO of the present invention for virtual storage of additional data in the FIFO.

The procedure 200 of FIG. 2a is carried out autonomously by the register memory device 38, 40, 42 of the FIFO arrangement 1.

In first step 201, the register memory device 38, 40, 42 reads the value of the write pointer WR_PTR from the write pointer register 50.

In following step 202, the virtual cell insertion controller 12 checks, for each data storage device 28, 30, 32, the arrival of a new digital data packet $D_{A1}$, $D_{A2}$, $D_{A3}$ to be inserted into the main data stream. If such an arrival is observed in a subroutine 203, the register memory device 38, 40, 42 checks in step 204 whether the LOC_PTR value is equal to the NULL_PTR.

If so, the momentary value of WR_PTR is stored into the respective register memory device 38, 40, 42 as a local pointer LOC_PTR (subroutine 205). In the consecutive step 206 the new digital data packet $D_{A1}$, $D_{A2}$, $D_{A3}$ is stored in the data storage device 28, 30, 32, corresponding to the respective register memory device 38, 40, 42 Within step 202, the subroutines 203–206 are repeated for each data storage device 28, 30, 32 in the arrangement 1.

It is to be understood that instead of directly storing the momentary value of WR_PTR into the respective register memory device 38, 40, 42 as a local pointer LOC_PTR, a value having a predetermined relation with the momentary value of WR_PTR may be stored as a registered write pointer value.

The procedure is to be performed continuously: after completion of step 202 the procedure returns to step 201.

FIG. 2b shows schematically a block diagram of a procedure performed by a FIFO of the present invention for inserting virtually stored additional data from the FIFO into an out-going data stream.

The procedure 250 of FIG. 2b is carried out by the virtual cell insertion controller 12 of the FIFO arrangement 1.

In first step 251, the virtual cell insertion controller 12 reads the value of the read pointer RD_PTR from the read pointer register 52.

In following step 252, for each data storage device 28, 30, 32, the virtual cell insertion controller 12 selects the respective register memory device 38, 40, 42.

In step 253, the virtual cell insertion controller 12 reads the pointer value LOC_PTR for the register memory device 38, 40, 42 of the respective selected data storage device 28, 30, 32.

In step 254, the virtual cell insertion controller 12 compares the value of LOC_PTR with the momentary value of RD_PTR.

If LOC_PTR equals RD_PTR, the procedure continues in step 255, else it continues at point 257.

In step 255, the virtual cell insertion controller 12 signals the selection device 8 to fetch the additional data $D_{A1}$, $D_{A2}$, $D_{A3}$ from the respective selected data storage device 28, 30, 32. Further, the selection device 8 is signalled to transmit the data into the out-going data stream $D_{out}$.

Subsequently, in step 256, the virtual cell insertion controller 12 sets the value of the selected LOC_PTR to the NULL pointer.

Within step 252, the steps 253–257 are repeated for each data storage device 28, 30, 32 in the arrangement 1.

In step 258, the virtual cell insertion controller 12 signals the selection device 8 to fetch the data, buffered in the FIFO memory 2 at the location indicated by RD_PTR, and to forward these data into the out-going data stream $D_{out}$.

In step 259, the read pointer RD_PTR is incremented to the next value.

The procedure is to be performed continuously: after completion of step 258 the procedure returns to step 251.

It is noted here that in step 254, a comparison is made between a stored value of LOC_PTR and the value of RD_PTR. As noted with respect to step 204 of FIG. 2a, the stored value of LOC_PTR may have a predetermined relation with WR_PTR. In that case, in step 254 it is checked if the stored value of LOC_PTR also has the predetermined relation with the momentary read pointer RD_PTR.

It is to be noted that in the FIFO arrangement 1 at least the two procedures 200 and 250 as described above are being carried out concurrently.

It is to be understood that the virtual cell insertion controller 12 may be implemented by software. It is also conceivable that the virtual cell insertion controller 12 is implemented by an arrangement of dedicated hardware component devices or by a specific device, such as an ASIC or an FPGA.

Further, it is to be understood that the data storage devices 28, 30, 32 may be arranged as a single storage device, containing suitable memory locations for storage of additional data $D_{A1}, D_{A2}, D_{A3}$. Also, the register memory devices 38, 40, 42 may be arranged as a single registering memory device.

Moreover, the data storage devices 28, 30, 32 and the register memory devices 38, 40, 42 may be arranged as a single registering and storage device.

Also, the data storage devices 28, 30, 32 and the register memory devices 38, 40, 42 may be implemented as (small) RAM within an ASIC or FPGA.

In FIG. 1 the virtual cell insertion controller 12 and the selection device 8 are presented as separate devices. As known to persons skilled in the art, the functions of these devices 8, 12 may be implemented as a single virtual cell insertion control and selection device.

The memory device 2 arranged as FIFO buffer is, preferably, an SRAM device, capable of the input and output of single bytes.

Also, in FIG. 1 the memory device 2 is depicted as a dual-port device. It may, however, be arranged as a single-port device in which the input and output of data is scheduled using a TDMA scheme as known in the art.

In the description given above, each of the register memory devices 38, 40, 42 stores the momentary value WR_PTR as a local pointer LOC_PTR, whenever additional data $D_{A1}, D_{A2}, D_{A3}$ arrives to be inserted into the output data stream $D_{out}$. However, it is to be understood that any other type of indication that reflects an association with that momentary value WR_PTR may be used and stored instead.

In its broadest sense, the virtual cell insertion controller 12 checks, at any time that a read action is to take place, whether or not, for the momentary value of RD_PTR, additional data has to be inserted into the output data stream $D_{out}$, which additional data is stored outside the FIFO, before the content of the FIFO cell to which the RD_PTR points is read and added to the output data stream $D_{out}$.

What is claimed is:

1. A FIFO buffer arrangement for temporarily buffering a data packet from an incoming data stream before releasing said data packet into an outgoing data stream, comprising a memory device, a write pointer register, a read pointer register, said data packet containing a plurality of bytes; said memory device comprising a write access port and a read access port, said write pointer register containing a write pointer; said read pointer register containing a read pointer; said write pointer being arranged to indicate a first location in said memory device, momentary available for storing said data packet; said read pointer being arranged to indicate a second location in said memory device, momentary available for releasing a stored data packet to the out-going data stream, said FIFO buffer arrangement comprises:

a controller complex and additional memory, said controller complex being connected to said additional memory, to said memory device, and to said read pointer register, said additional memory being arranged to store at least one additional data packet, said controller complex being arranged to:
continuously monitor the arrival of said at least one additional data packet in said additional memory;
store a registered write pointer value each time at least one additional data packet arrives in said additional memory, said registered write pointer value having a predetermined relation with a momentary value of said write pointer at that time;
continuously monitor a momentary value of said read pointer;
check whether said read pointer has said predetermined relation with said registered write pointer value;
if so, read said at least one additional data packet from said additional memory and insert said at least one additional data packet in said outgoing data stream;
read content from said second location in said memory device and insert said content into said outgoing data stream.

2. The FIFO buffer arrangement according to claim 1 wherein said FIFO buffer arrangement further comprises a selection device, a virtual cell insertion controller, data storage means, register memory means, an exit port, input means; said selection devicebeing connected to said read access port and said exit port; said virtual cell insertion controller being connected to said write pointer register, said read pointer register, to said selection device, said data storage means, and said register memory means; said input means being connected to said data storage means and being arranged to insert an additional data packet into said data storage means; said register memory means is arranged to:
monitor continuously the arrival of said additional data packe in said data storage means;
register the instant of arrival of said additional data packet by storing a momentary value, related to said instant of arrival, in said register memory device related to said data storage means as a registered write pointer value;
and said virtual cell insertion controller is also arranged to:
monitor continuously the momentary value of said read pointer;
compare said value of said read pointer with said registered write pointer value stored in said register memory means;

on equality of said value of said read pointer and said registered write pointer value, instruct said selection device to fetch the additional data packet from the data storage means related to the register memory means containing said registered write pointer value and, further, transmit said additional data packet into said out-going data stream;

instruct said selection device to fetch a byte from said second location in said memory device, said second location being indicated by the momentary value of said read pointer.

3. The FIFO buffer arrangement according to claim 2 wherein said data storage device and said register memory device are arranged as a combined register memory and data storage device.

4. The FIFO buffer arrangement according to claim 2 wherein said virtual cell insertion controller and said selection device are arranged as a combined virtual cell insertion control and selection device.

5. The FIFO buffer arrangement according to claim 2 wherein said virtual cell insertion controller, said selection device, said data storage device and said register memory device are arranged as a single combined controller device.

6. The FIFO buffer arrangement according to claim 5 wherein said single combined controller device is an ASIC or FPGA device.

7. The FIFO buffer arrangement according to claim 1 wherein said memory device is a dual-port SRAM device.

8. The FIFO buffer arrangement according to claim 1 wherein said memory device is a single-port SRAM device using a Time Division Multiple Access scheme.

9. A method to be carried out by a FIFO buffer arrangement for temporarily buffering a data packet from an incoming data stream before releasing said data packet into an outgoing data stream, comprising a memory device, a write pointer register, a read pointer register, said data packet containing a plurality of bytes; said memory device comprising a write access port and a read access port, said write pointer register containing a write pointer; said read pointer register containing a read pointer; said write pointer being arranged to indicate a first location in said memory device, momentary available for storing said data packet; said read pointer being arranged to indicate a second location in said memory device, momentary available for releasing a stored data packet to the out-going data stream; said FIFO buffer arrangement also comprising a controller complex and additional memory, said controller complex being connected to said additional memory, to said memory device, to said write pointer register and to said read pointer register, said additional memory being arranged to store at least one additional data packet, said method comprises the steps of:

continuously monitoring arrival of said at least one additional data packet in said additional memory;

storing a registered write pointer value each time at least one additional data packet arrives in said additional memory, said registered write pointer value having a predetermined relation with a momentary value of said write pointer at that time continuously monitoring a momentary value of said read pointer;

checking whether said read pointer has said predetermined relation with said registered write pointer value if so, reading said at least one additional data packet from said additional memory and inserting said at least one additional data packet in said outgoing data stream;

reading content from said second location in said memory device and inserting said content into said outgoing data stream.

10. A computer program product to be loaded by a FIFO buffer arrangement for temporarily buffering a data packet from an incoming data stream before releasing said data packet into an outgoing data stream, comprising a memory device, a write pointer register, a read pointer register, said data packet containing a plurality of bytes; said memory device comprising a write access port and a read access port, said write pointer register containing a write pointer; said read pointer register containing a read pointer, said write pointer being arranged to indicate a first location in said memory device, momentary available for storing said data packet; said read pointer being arranged to indicate a second location in said memory device, momentary available for releasing a stored data packet to the out-going data stream; said FIFO buffer arrangement also comprising a controller complex and additional memory, said controller complex being connected to said additional memory, to said memory device, to said write pointer register and to said read pointer register, said additional memory being arranged to store at least one additional data packet, and said computer program product arranged to:

continuously monitor the arrival of said at least one additional data packet in said additional memory;

store a registered write pointer value each time at least one additional data packet arrives in said additional memory, said registered write pointer value having a predetermined relation with a momentary value of said write pointer at that time continuously monitor a momentary value of said read pointer;

check whether said read pointer has said predetermined relation with said registered write pointer value if so, read said at least one additional data packet from said additional memory and insert said at least one additional data packet in said outgoing data stream read content from said second location in said memory device and insert said content into said outgoing data stream.

11. A data carrier provided with a computer program product in accordance with claim 10.

* * * * *